US006219662B1

(12) United States Patent
Fuh et al.

(10) Patent No.: US 6,219,662 B1
(45) Date of Patent: Apr. 17, 2001

(54) SUPPORTING DATABASE INDEXES BASED ON A GENERALIZED B-TREE INDEX

(75) Inventors: Gene Y. C. Fuh; Stefan Dessloch, both of San Jose; Daniel Tsunfang Lee, Fremont; Ping Li, San Jose; Nelson Mendonca Mattos, San Jose; Shahrokh Talmoud, San Jose; Yun Wang, Saratoga, all of CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/112,723

(22) Filed: Jul. 9, 1998

Related U.S. Application Data

(60) Provisional application No. 60/052,180, filed on Jul. 10, 1997.

(51) Int. Cl.[7] .................................................. G06F 17/30
(52) U.S. Cl. .................... 707/3; 707/8; 707/10; 707/102; 707/103; 707/104; 707/204; 707/206
(58) Field of Search .................... 707/1, 2, 3, 4, 707/8, 10, 103, 104, 204, 100, 102, 206

(56) References Cited

U.S. PATENT DOCUMENTS

| 4,531,186 | 7/1985 | Knapman ................................ 707/5 |
| 4,841,433 | 6/1989 | Hakim et al. ............................ 707/3 |

(List continued on next page.)

FOREIGN PATENT DOCUMENTS 0 650 131 A1    4/1995 (DE) .

OTHER PUBLICATIONS

IEEE publication, "Constructing Optimal Search Trees in Optimal Time", by S.Q. Zheng and M. Sun, pp. 738–743, Jul. 1999.*

"Heirarchical Data Model for a Relational Database based Geographic Information System", *IBM® Technical Disclosure Bulletin*, 40(03):107–116 (Mar. 1997).

Lynch, C. et al., "Extended User–Defined Indexing with Application to Textual Databases", *Proceedings of the 14th VLDB Conference*, pp. 306–317 (1988).

Rudolf Bayer, "The Universal B—Tree for Multidimensional Indexing: General Concepts", Worldwide Computing and Its Applications, International Conference, WWCA '97, Tsukuba, Japan, (Mar. 1997), pp. 198–209.

Faloutsos, C. et al., "Fast Map: A Fast Algorithm for Indexing, Data—Mining and Visualization of Traditional and Multimedia Datasets", Proc. of ACM SIGMOD, pp. 163–174 (May 1995).

Ouksel, M. et al., "Multidimensional B–trees: Analysis of Dynamic Behavior", Dept. of Elec. Eng. and Computer Science, Northwestern Univ., Evanston, Ill, BIT 21, pp. 401–418 (1981).

(List continued on next page.)

*Primary Examiner*—Paul R. Lintz
*Assistant Examiner*—Diane D. Mizrahi
(74) *Attorney, Agent, or Firm*—Pretty & Schroeder, P.C.

(57) ABSTRACT

A method, apparatus, and article of manufacture for computer-implemented support of database indexes based on a generalized B-tree index. The index is stored in a B-tree on a data storage device connected to a computer. In particular, multiple key sources are processed using key transformation. Then, a plurality of key targets are generated based on the processed key sources.

24 Claims, 6 Drawing Sheets

U.S. PATENT DOCUMENTS

| | | | |
|---|---|---|---|
| 5,043,872 | | 8/1991 | Cheng et al. .............................. 707/2 |
| 5,261,088 | * | 11/1993 | Baird et al. .......................... 707/206 |
| 5,276,870 | * | 1/1994 | Shan et al. ............................... 707/2 |
| 5,299,123 | | 3/1994 | Wang et al. .............................. 707/2 |
| 5,327,543 | | 7/1994 | Miura et al. .......................... 712/224 |
| 5,367,675 | * | 11/1994 | Cheng et al. .............................. 707/2 |
| 5,404,510 | | 4/1995 | Smith et al. .............................. 707/2 |
| 5,454,039 | | 9/1995 | Coppersmith et al. .................. 380/28 |
| 5,544,357 | | 8/1996 | Huei ......................................... 707/2 |
| 5,546,576 | | 8/1996 | Cochrane et al. .................... 707/104 |
| 5,553,281 | | 9/1996 | Brown et al. ......................... 707/104 |
| 5,590,325 | | 12/1996 | Kolton et al. ......................... 707/104 |
| 5,604,892 | | 2/1997 | Nuttall et al. ........................... 703/18 |
| 5,608,904 | | 3/1997 | Chaudhuri et al. ...................... 707/2 |
| 5,619,692 | | 4/1997 | Malkemus et al. ....................... 707/2 |
| 5,630,125 | | 5/1997 | Zellweger ............................. 707/103 |
| 5,630,127 | | 5/1997 | Moore et al. ......................... 707/104 |
| 5,765,147 | * | 6/1998 | Mattos et al. ............................. 707/4 |
| 5,848,408 | * | 12/1998 | Jakobsson et al. ....................... 707/3 |
| 5,852,822 | * | 12/1998 | Srinivasan et al. ...................... 707/4 |
| 6,061,678 | * | 5/2000 | Klein et al. ............................... 707/3 |

OTHER PUBLICATIONS

Klaus, F. et al., "Flexible, Runtime Efficient Fector—Radix Algorithms For Multidimensional Fast Fourier Transform", SPIE, vol. 2247, Sensors and Control for Automation, pp. 216–226 (1994).

Sang, K.S. et al., "Applicability of genetic algorithms to optimal evaluation of path predicates in object—oriented queries", Information Processing Letters, vol. 58, No. 3, pp. 123–128 (abstract), (May 1996).

Byungwook, K. et al., "A new indexing scheme supporting multi—attribute database applications: MAX", Journal of Systems Architecture, vol. 42, No. 2, (abstract), (Sep. 1996), page 1.

Silberschatz, A. et al., "Managing Class Types", SPI Database of Software Technologies, 6 pages, (May 1977).

Scheuermann, P. et al., "Multidimensional B—Trees For Associative Searching In Database Systems", Inform. Systems, vol. 7, No. 2, pp. 123–137 (1982).

* cited by examiner

SUPPORTING DATABASE INDEXES BASED ON A GENERALIZED B-TREE INDEX

PROVISIONAL APPLICATION

This application claims the benefit of U.S. Provisional application No. 60/052,180, entitled "User Defined Search in Relational Database Management Systems," filed on Jul. 10, 1997, by Gene Y. C. Fuh et al., attorney's reference number ST9-97-046, which is incorporated by reference herein.

CROSS-REFERENCE TO RELATED APPLICATIONS

This application is related to the following copending and commonly-assigned patent applications:

Application Ser. No. 08/914,394 entitled "User-Defined Search in Relational Database Management Systems," filed on same date herewith, by Gene Y. C. Fuh, et al., attorney's docket number ST9-97-046;

Application Ser. No. 09/112,301, entitled "Multiple-Stage Evaluation of User-Defined Predicates," filed on same date herewith, by Gene Y. C. Fuh, et al., attorney's docket number ST9-98-022;

Application Ser. No. 09/112,307, entitled "A Generalized Model for the Exploitation of Database Indexes," filed on same date herewith, by Gene Y. C. Fuh, et al., attorney's docket number ST9-98-023;

Application Ser. No. 09/113,802, entitled "Run-time Support for User-Defined Index Ranges and Index Filters," filed on same date herewith, by Michelle Jou, et al., attorney's docket number ST9-98-025;

Application Ser. No. 09/112,302, entitled "A Fully Integrated Architecture for User-Defined Search," filed on same date herewith, by Gene Y. C. Fuh, et al., attorney's docket number ST9-98-026;

Application Ser. No. 08/786,605, entitled "A Database Management System, Method and Program for Supporting the Mutation of a Composite Object Without Read/Write and Write/Write Conflicts," filed on Jan. 21, 1997, now U.S. Pat. No. 5,857,182 by Linda G. DeMichiel, et al., attorney's docket number ST9-97-001; and Application Ser. No. 08/914,394, entitled "An Optimal Storage Mechanism for Persistent Objects in DBMS," filed on Aug. 19, 1997, now U.S. Pat. No. 6,065,013 by Gene Y. C. Fuh, et al., attorney's docket number ST9-97-088;

all of which are incorporated by reference herein.

BACKGROUND OF THE INVENTION

1. Field of the Invention

This invention relates in general to computer-implemented database systems, and, in particular, to supporting database indexes based on a generalized B-tree index.

2. Description of Related Art

Databases are computerized information storage and retrieval systems. A Relational Database Management System (RDBMS) is a database management system (DBMS) which uses relational techniques for storing and retrieving data. Relational databases are organized into tables which consist of rows and columns of data. The rows are formally called tuples or records. A database will typically have many tables and each table will typically have multiple tuples and multiple columns. The tables are typically stored on direct access storage devices (DASD), such as magnetic or optical disk drives for semipermanent storage.

Many traditional business transaction processing is done using a RDBMS. Since the inclusion of RDBMSs in business, user-defined data types and user-defined functions have been brought into RDBMSs to enrich the data modeling and data processing power. User-defined data based on the user-defined data types may include audio, video, image, text, spatial data (e.g., shape, point, line, polygon, etc.), time series data, OLE documents, Java objects, C++ objects, etc.

A table in a database can be accessed using an index. An index is an ordered set of references (e.g., pointers) to the records or rows in a database file or table. The index is used to access each record in the file using a key (i.e., one of the fields of the record or attributes of the row). Without an index, finding a record would require a scan (e.g., linearly) of an entire table. Indexes provide an alternate technique to accessing data in a table. Users can create indexes on a table after the table is built. An index is based on one or more columns of the table. A B-tree is a binary tree that may be used to store the references to the records in a table.

When a table contains user-defined data, conventional systems typically do not provide adequate support for database indexes based on a generalized B-tree index. Therefore, there is a need in the art for an improved technique for supporting database indexes based on a generalized B-tree index.

SUMMARY OF THE INVENTION

To overcome the limitations in the prior art described above, and to overcome other limitations that will become apparent upon reading and understanding the present specification, the present invention discloses a method, apparatus, and article of manufacture for supporting database indexes based on a generalized B-tree index.

In accordance with the present invention, an index is stored in a B-tree, which is stored on a data storage device connected to a computer. In particular, multiple key sources are processed using key transformation. Then, a plurality of key targets are generated based on the processed key sources.

An object of the invention is to support database indexes based on a generalized B-tree index. Another object of the invention is to provide a "m-l-n" model for key transformation.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and which is shown by way of illustration a specific embodiment in which the invention may be practiced. It is to be understood that other embodiments may be utilized as structural changes may be made without departing from the scope of the present invention.

Hardware Environment

Figure 1:
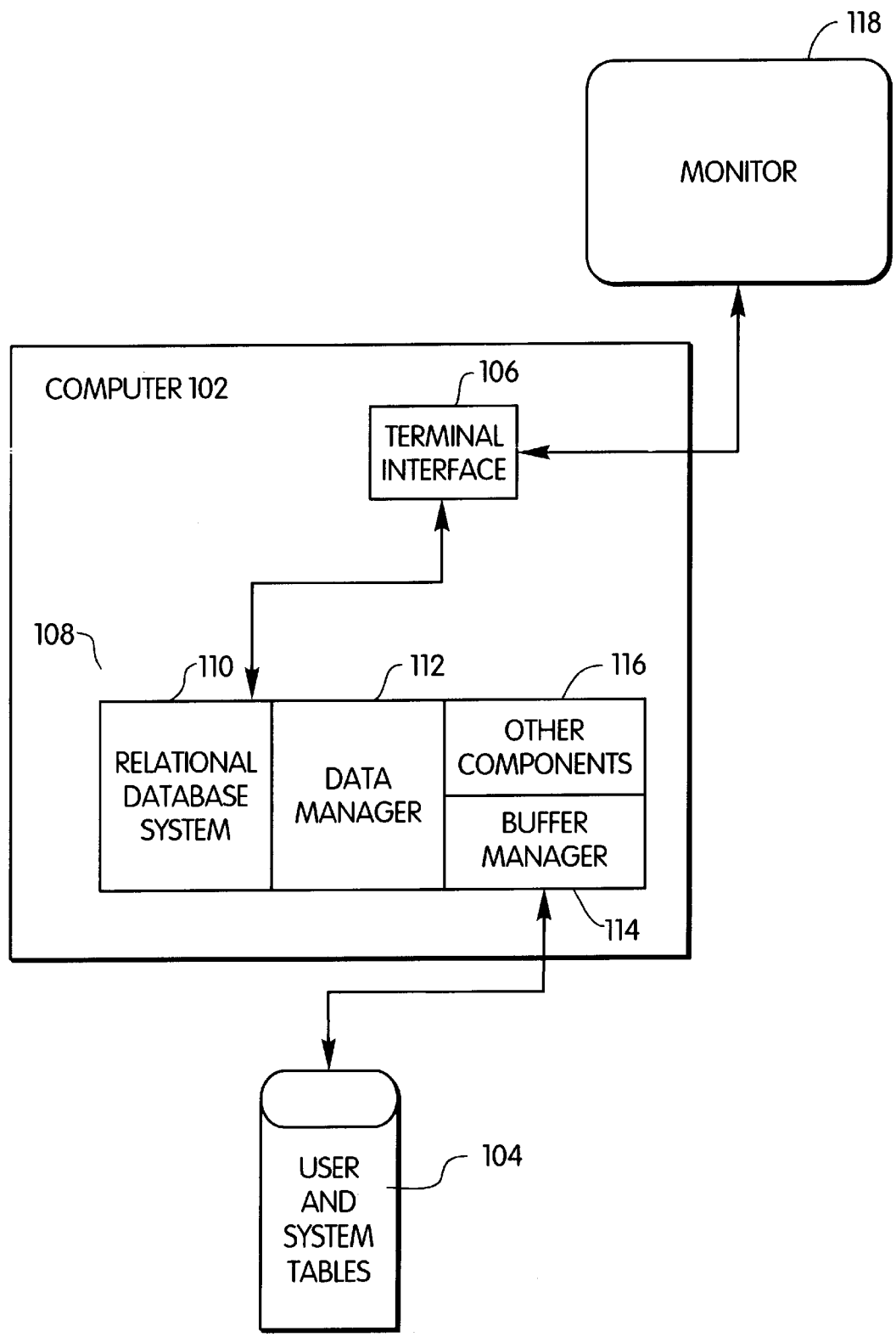
FIG. 1 illustrates an exemplary computer hardware environment that could be used in accordance with the present invention.

FIG. 1 illustrates an exemplary computer hardware environment that could be used in accordance with the present invention. In the exemplary environment, a computer system 102 is comprised of one or more processors connected to one or more data storage devices 104, such as a fixed or hard disk drive, a floppy disk drive, a CDROM drive, a tape drive, or other device, that store one or more relational databases.

Operators of the computer system 102 use a standard operator interface 106, such as IMS/DB/DC®, CICS®, TSO®, OS/390®, ODBC® or other similar interface, to transmit electrical signals to and from the computer system 102 that represent commands for performing various search and retrieval functions, termed queries, against the databases. In the present invention, these queries conform to the Structured Query Language (SQL) standard, and invoke functions performed by Relational DataBase Management System (RDBMS) software.

The SQL interface has evolved into a standard language for RDBMS software and has been adopted as such by both the American National Standards Institute (ANSI) and the International Standards Organization (ISO). The SQL interface allows users to formulate relational operations on the tables either interactively, in batch files, or embedded in host languages, such as C and COBOL. SQL allows the user to manipulate the data.

In the preferred embodiment of the present invention, the RDBMS software comprises the DB2® product offered by IBM for the AIX® operating system. Those skilled in the art will recognize, however, that the present invention has application to any RDBMS software, whether or not the RDBMS software uses SQL.

At the center of the DB2® system is the Database Services module 108. The Database Services module 108 contains several submodules, including the Relational Database System (RDS) 110, the Data Manager 112, the Buffer Manager 114, and other components 116 such as an SQL compiler/interpreter. These submodules support the functions of the SQL language, i.e. definition, access control, interpretation, compilation, database retrieval, and update of user and system data.

The present invention is generally implemented using SQL statements executed under the control of the Database Services module 108. The Database Services module 108 retrieves or receives the SQL statements, wherein the SQL statements are generally stored in a text file on the data storage devices 104 or are interactively entered into the computer system 102 by an operator sitting at a monitor 118 via operator interface 106. The Database Services module 108 then derives or synthesizes instructions from the SQL statements for execution by the computer system 102.

Generally, the RDBMS software, the SQL statements, and the instructions derived therefrom, are all tangibly embodied in a computer-readable medium, e.g. one or more of the data storage devices 104. Moreover, the RDBMS software, the SQL statements, and the instructions derived therefrom, are all comprised of instructions which, when read and executed by the computer system 102, causes the computer system 102 to perform the steps necessary to implement and/or use the present invention. Under control of an operating system, the RDBMS software, the SQL statements, and the instructions derived therefrom, may be loaded from the data storage devices 104 into a memory of the computer system 102 for use during actual operations.

Thus, the present invention may be implemented as a method, apparatus, or article of manufacture using standard programming and/or engineering techniques to produce software, firmware, hardware, or any combination thereof. The term "article of manufacture" (or alternatively, "computer program product") as used herein is intended to encompass a computer program accessible from any computer-readable device, carrier, or media. Of course, those skilled in the art will recognize many modifications may be made to this configuration without departing from the scope of the present invention.

Those skilled in the art will recognize that the exemplary environment illustrated in FIG. 1 is not intended to limit the present invention. Indeed, those skilled in the art will recognize that other alternative hardware environments may be used without departing from the scope of the present invention.

Figure 2:
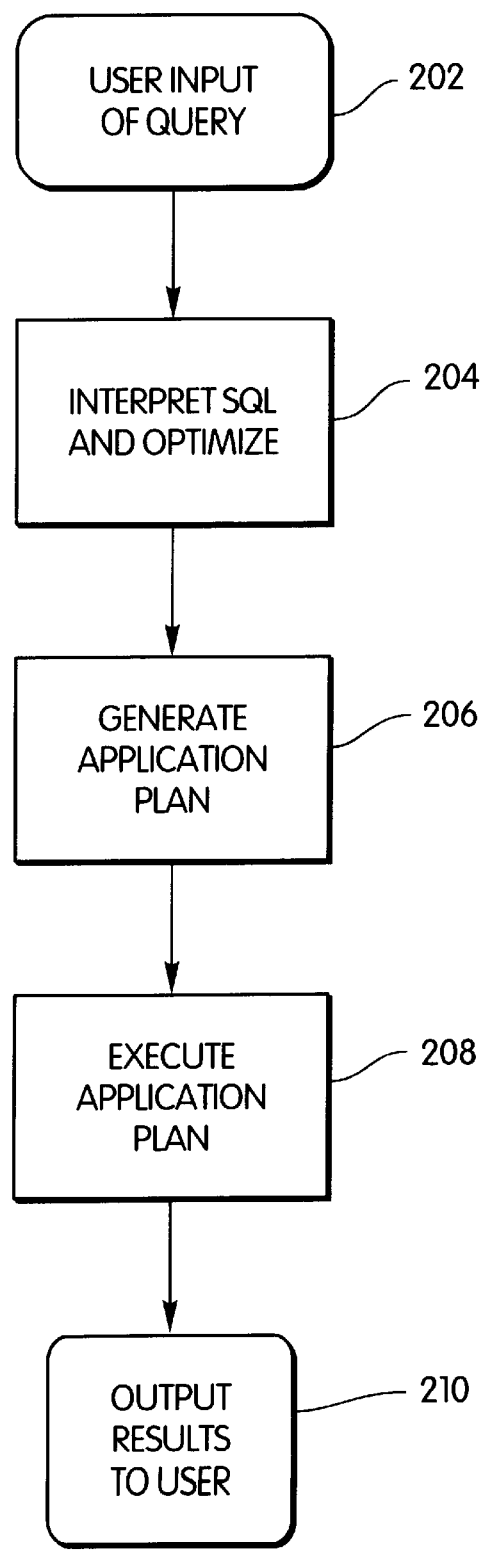
FIG. 2 is a flowchart illustrating the steps necessary for the interpretation and execution of SQL statements in an interactive environment according to the present invention.

FIG. 2 is a flowchart illustrating the steps necessary for the interpretation and execution of SQL statements in an interactive environment according to the present invention. Block 202 represents the input of SQL statements into the computer system 102 from the user. Block 204 represents the step of compiling or interpreting the SQL statements. An optimization function within block 204 may optimize the SQL. Block 206 represents the step of generating a compiled set of run-time structures called an application plan from the compiled SQL statements. Generally, the SQL statements received as input from the user specify only the data that the user wants, but not how to get to it. This step considers both the available access paths (indexes, sequential reads, etc.) and system held statistics on the data to be accessed (the size of the table, the number of distinct values in a particular column, etc.), to choose what it considers to be the most efficient access path for the query. Block 208 represents the execution of the application plan, and block 210 represents the output of the results of the application plan to the user.

Figure 3:
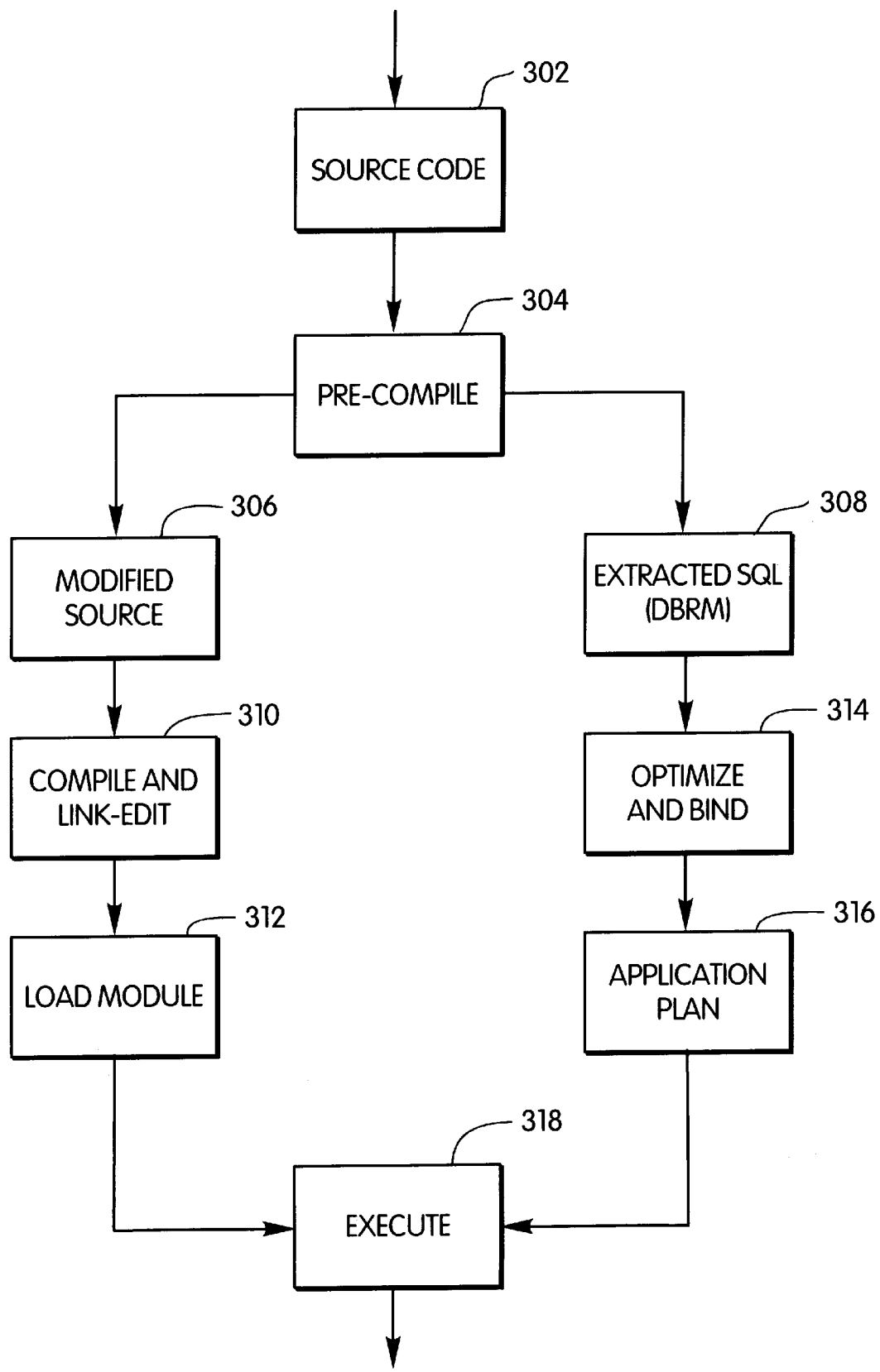
FIG. 3 is a flowchart illustrating the steps necessary for the interpretation and execution of SQL statements embedded in source code according to the present invention.

FIG. 3 is a flowchart illustrating the steps necessary for the interpretation and execution of SQL statements embedded in source code according to the present invention. Block 302 represents program source code containing a host language (such as COBOL or C) and embedded SQL statements. The program source code is then input to a pre-compile step 304. There are two outputs from the pre-compile step 304: a modified source module 306 and a Database Request Module (DBRM) 308. The modified source module 306 contains host language calls to DB2, which the pre-compile step 304 inserts in place of SQL statements. The DBRM 308 consists of the SQL statements from the program source code 302. A compile and link-edit step 310 uses the modified source module 306 to produce a load module 312, while an optimize and bind step 314 uses the DBRM 308 to produce a compiled set of run-time structures for the application plan 316. As indicated above in conjunction with FIG. 2, the SQL statements from the program source code 302 specify only the data that the user wants, but not how to get to it. The optimize and bind step 314 may reorder the SQL query in a manner described in more detail later in this specification. Thereafter, the optimize and bind step 314 considers both the available access paths (indexes, sequential reads, etc.) and system held statistics on the data to be accessed (the size of the table, the number of distinct values in a particular column, etc.), to choose what it considers to be the most efficient access path for the query. The load module 312 and application plan 316 are then executed together at step 318.

The Extended DBMS Architecture for User-Defined Search

Figure 4:
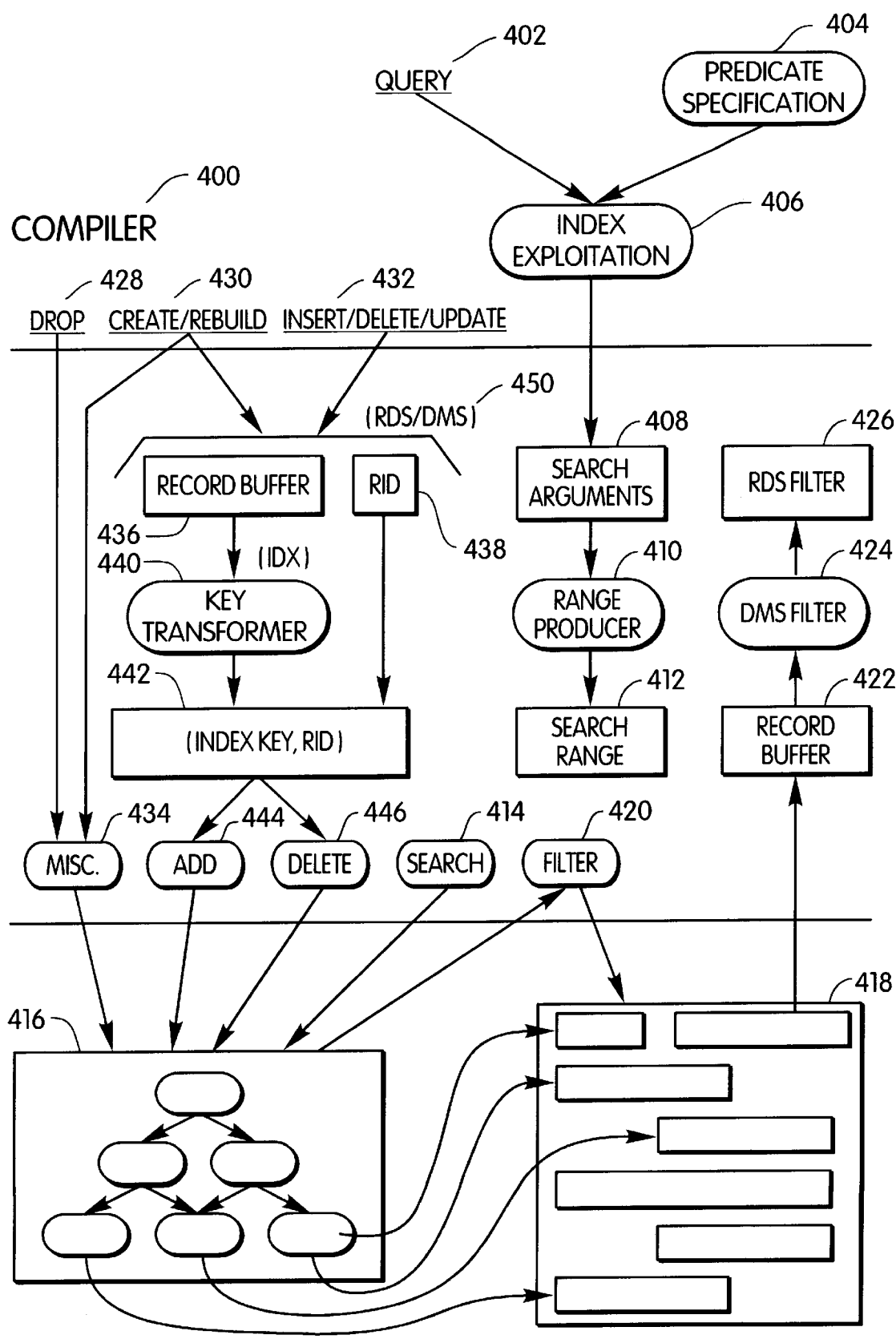
FIG. 4 illustrates a compiler of the present invention.

FIG. 4 illustrates a compiler 400 of the present invention, which performs steps 204 and 206, discussed above. The compiler 400 of the present invention contains the following "extended" modules: Predicate Specification 404 and Index Exploitation 406. The run-time 450 of the present invention contains the following "extended" modules: Range Producer 410. DMS Filter 424, RDS Filter 426, and Key Transformer 440. The "extended" modules have been modified to provide the capability for pushing user-defined types, index maintenance and index exploitation, and user-defined functions and predicates inside the database.

The Predicate Specification module 404 has been extended to handle user-defined predicates. The Index Exploitation module 406 has been modified to exploit user-defined indexes and provide more sophisticated pattern matching (e.g., recognizes "salary+bonus").

Additionally, the Predicate Specification module 404, the Index Exploitation module 406, and the DMS Filter module 424 work together to provide a technique to evaluate user-defined predicates using a three-stage technique. In the first stage, an index is applied to retrieve a subset of records using the following modules: Search Arguments 408, Range Producer 410, Search Range 412, Search 414, and Filter 420. For the records retrieved, in the second stage, an approximation of the original predicate is evaluated by applying a user-defined "approximation" function to obtain a smaller subset of records, which occurs in the DMS Filter module. In the third stage, the predicate itself is evaluated to determine whether the smaller subset of records satisfies the original predicate.

The Range Producer module 410 has been extended to handle user-defined ranges, and, in particular, to determine ranges for predicates with user-defined functions and user-defined types. The DMS Filter module 424 and the RDS Filter module 426 have been extended to handle user-defined functions for filtering data.

To process a query 402, the compiler 400 receives the query 402. The query 402 and the predicate specification from the Predicate Specification module 404 are submitted to the Index Exploitation module 406. The Index Exploitation module 406 performs some processing to exploit indexes. At run-time, the Search Arguments module 408 evaluates the search argument that will be used by the Range Producer module 410 to produce search ranges. The Range Producer module 410 will generate search ranges based on user-defined functions. The Search Range module 412 will generate final search ranges. The Search module 414 will perform a search using the B-Tree 416 to obtain the record identifier (ID) for data stored in the data storage device 418. The retrieved index key is submitted to the Filter module 420, which eliminates non-relevant records. Data is then fetched into the Record Buffer module 422 for storage. The DMS Filter module 424 and the RDS Filter module 426 perform final filtering.

The Key Transformer module 440 has been modified to enable users to provide user-defined key transformations for processing inputs to produce a set of index keys. A user-defined key transformation can be any expression, including a scalar function or table function. A scalar function generates multiple key parts to be concatenated into an index key. A table function generates multiple sets of key parts, each of which is to be concatenated into an index key. Additionally, the input to the Key Transformer module 440 can include multiple values (e.g., values from multiple columns or multiple attributes of a structured type), and the user-defined functions can produce one or more index keys.

The compiler 400 can process various statements, including a Drop 428, Create/Rebuild 430, or Insert/Delete/Update 432 statements. A Drop statement 428 may be handled by Miscellaneous modules 434 that work with the B-Tree 416 to drop data.

An Insert/Delete/Update statement produce record data in the Record Buffer module 436 and the RID module 438. The data in the Record Buffer module 436 is submitted to the Key Transformer module 440, which identifies key sources in the records it receives. Key targets from the Key Transformer module 440 and record identifiers from the RID module 438 are used by the Index Key/RID module 442 to generate an index entry for the underlying record. Then, the information is passed to the appropriate module for processing, for example, an Add module 444 or a Delete module 446.

The compiler 400 will process a Create/Rebuild statement 430 in the manner of the processing a Drop statement 428 when data is not in the table or an Insert/Delete/Update statement 432 when data is in the table.

Supporting Database Indexes Based On A Generalized B-Tree Index

In the present invention, the Key Transformer module 440, illustrated in FIG. 4, uses key transformation that are either built-in to a system or are provided by users. The key transformation processes inputs (e.g., table columns) to the Key Transformer module 440 to produce one or more index keys. The inputs to the Key Transformer module 440 can include multiple values (e.g, values from multiple columns or multiple attributes of a structured type). Additionally, the key transformation can produce multiple index keys, which together are used to index the given inputs. The Key Transformer module 440 is able to index on any type of data (e.g., spatial objects), as long as functions are available to process that type of data and the data type is indexable. The Key Transformer module 440 works in all index scenarios, including: Create, Drop, Rebuild, Insert, Update, and Delete.

Figure 5:
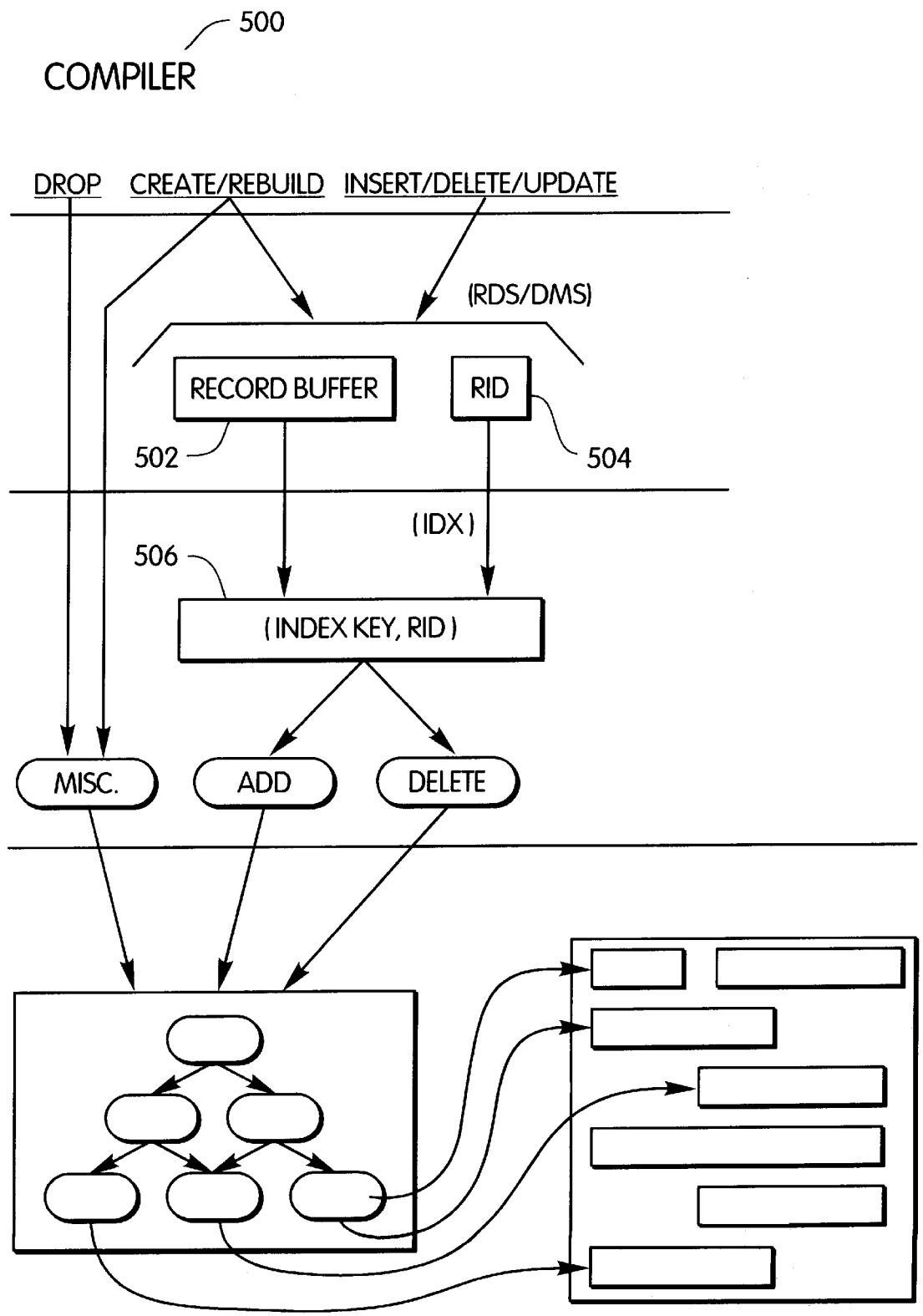
FIG. 5 is a block diagram illustrating a conventional system for database indexes.

FIG. 5 is a block diagram illustrating a conventional system for database indexes. In FIG. 5, when Create/Rebuild, indexed with data in the table, or Insert/Delete/Update statements are received by the compiler 500, the statements are processed by a Record Buffer module 502 and a RID module 504. The output of these modules is sent to the Index Key/RID module 506, which generates a unique identifier for a record using the index key and record identifier for the record.

The following pseudocode provides an example of a statement processed using a conventional system:
CREATE TABLE emp (id int, name char(20), salary float, bonus float);
CREATE INDEX index1 on emp (salary, bonus);
SELECT name FROM emp
    WHERE salary >20000 and salary <50000 and bonus ≧5000;

The CREATE TABLE statement creates a table named "emp", which contains four columns for an id, a name, salary, and bonus. The CREATE INDEX statement creates an index for the "emp" table using the salary and bonus columns as keys. The SELECT statement selects names from the "emp" table based on salary and bonus.

The conventional system of FIG. 5 allows one index entry per record, orders records linearly, and works well only for one-dimensional searching. The conventional system works in six index scenarios: Create, Drop, Rebuild, Insert, Update, and Delete.

The conventional system has a number of disadvantages. For example, the conventional system cannot index on non-linear objects. The conventional system cannot handle an index, such as a grid index defined with the following: (xmin, ymin, xmax, ymax). The conventional system cannot process expressions, such as (salary+bonus). The conventional system cannot index on compound objects, such as abstract data types of the form, emp..lastname.

Figure 6:
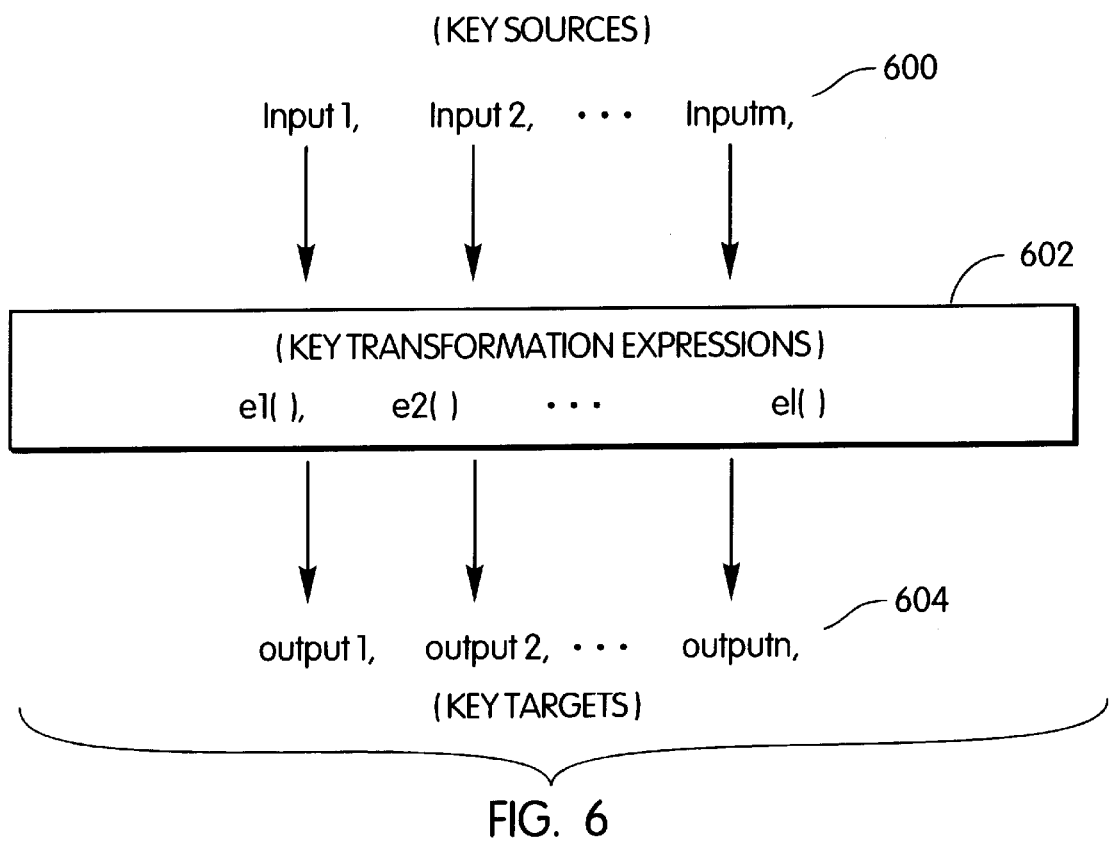
FIG. 6 illustrates an example of the "m-l-n" model.

The Key Transformer module 440 follows an "m-l-n" module, in which "m" inputs are submitted to "l" expressions to produce "n" outputs. FIG. 6 illustrates an example of the "m-l-n" model. In FIG. 6, the Key Transformer module 440 contains several expressions 602, e1(), e2(), and e1(), with the ellipses indicating that additional expressions may be included in the module 440.

As illustrated in FIG. 4, the Key Transformer module 440 receives inputs from the Record Buffer module 436. The inputs 600, such as input1, input2, and inputm, are "m" key sources (e.g., values of some or all of the attributes of a structured data type). The expressions 602 are "l" expressions used for key transformation. The outputs 604, such as output1, output2, and outputn, are "n" key targets for the B-tree. The expressions 602 can be any expressions, including built-in functions or user-defined functions. User-defined functions can be scalar functions or table functions. A table unction can produce more than one result, for example, multiple keys may be generated by the table function from one tuple. The "m-l-n" model especially advantageous in that it can support a variety of indexes, including B-tree indexes, spatial (grid) indexes, indexes on expression, text indexes.

Figure 7:
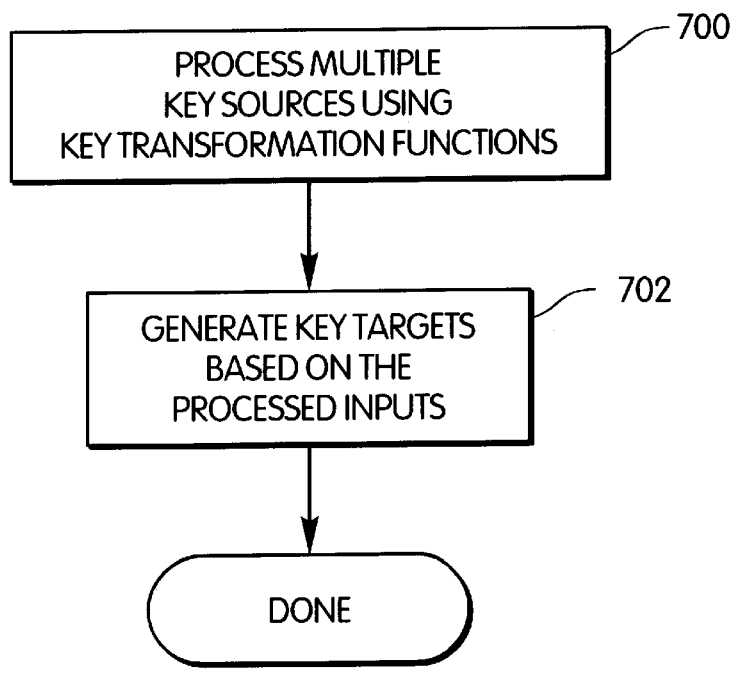
FIG. 7 is a flow diagram illustrating the steps performed by the Key Transformer module.

FIG. 7 is a flow diagram illustrating the steps performed by the Key Transformer module 440. In Block 700, the Key Transformer module 440 receives a plurality of key sources. In Block 702, the Key transformer module 440 processes the received key sources using key transformation. In Block 704, the Key Transformer module 440 generates key targets based on the processed inputs.

The following example illustrates the advantages of the Key Transformer module 440 for an index on an expression:

CREATE TABLE employee1 (name varchar(20), salary int, bonus int);
CREATE INDEX empindx1 on employee1 (salary+bonus, name);

The CREATE TABLE statement above creates a table, named "employee1", that includes a salary column and a bonus column. The CREATE INDEX statement above creates an index, named "empindx1", that uses the expression "salary+bonus". That is, the Key Transformer module 440 can be extended with functions that can add the salary and bonus columns when creating the index.

The following example illustrates the advantages of the Key Transformer module 440 for an index on a compound object:

CREATE ADT empinfo (name varchar(20), address varchar(40));
CREATE TABLE employee2 (emp empinfo salary int, bonus int);
CREATE INDEX empindx2 on employee2 (emp..name, emp..address, salary);

The CREATE ADT statement creates an abstract data type structure for a compound object named "empinfo" and having name and address fields. The CREATE TABLE statement creates a table named "employee2" with three columns, including an "emp" column that is of type "empinfo". The CREATE INDEX statement creates an index on the table in which the column names include compound objects, including "emp..name" and "emp..address".

The following example illustrates the advantages of the Key Transformer module 440 for an index on a spatial object:

CREATE ADT loc (xmin int, ymin int, xmax int, ymax int);
CREATE TABLE employee3 (name varchar(20), address varchar(40), location loc);
CREATE INDEX EXTENSION ie4loc ( . . . ) . . . generated by GridEntry ( . . . ) . . . ;
CREATE INDEX employee3 on employee3 (loc) using . . . ie4loc ( . . . );

The CREATE ADT statement creates an abstract data type structure for a spatial object. The CREATE TABLE statement creates a table that includes a column named "location" that is a spatial object. The CREATE INDEX EXTENSION statement creates an index extension named "ie4loc" using a user-defined function called GridEntry. The CREATE INDEX EXTENSION statement also defines a key transformer function, defines a filter, and defines predicates. The CREATE INDEX employee3 statement creates an index on the spatial object column "loc" using the index extension "ie4loc".

The Key Transformer module 440 enables users to provide user-defined logic for creating indexes. Additionally, the Key Transformer module 440 allows multiple index entries for each record. In the present embodiment, the Key Transformer module 440 is embedded in the Index Manager component of the RDBMS. The key transformation functions can be implemented at run-time or at compile-time. the Key Transformer module 440 is built on top of the current B-tree used for indexing.

The Key Transformer module 440 is especially advantageous as it has a minimum impact on existing systems and is easy to implement on top of current systems. Additionally, it is also advantageous in that it is efficient and provides data integrity.

Conclusion

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

In summary, the present invention discloses a method, apparatus, and article of manufacture for computer-implemented support of database indexes based on a generalized B-tree index. In addition to supporting database indexes based on a generalized B-tree index, the present invention provides a "m-l-n" model for key transformation.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of generating an index stored in a B-tree, which is stored on a data storage device connected to a computer, the method comprising the steps of:

processing one or more key sources using key transformation; and generating a plurality of key targets based on the processed key sources.

2. The method of claim 1, wherein at least one of the key sources comprises an attribute.

3. The method of claim 1, wherein at least one of the key sources comprises a compound object.

4. The method of claim 1, wherein the key transformation comprises an expression.

5. The method of claim 4, wherein the expression is a built-in function.

6. The method of claim 4, wherein the expression is a user-defined function.

7. The method of claim 4, wherein the expression is a scalar function.

8. The method of claim 4, wherein the expression is a table function.

9. An apparatus for generating an index, comprising:

a computer having a data storage device connected thereto, wherein the data storage device stores an index stored in a B-tree;

one or more computer programs, performed by the computer, processing one or more key sources using key transformation and generating a plurality of key targets based on the processed key sources.

10. The apparatus of claim 9, wherein at least one of the key sources comprises an attribute.

11. The apparatus of claim 9, wherein at least one of the key sources comprises a compound object.

12. The apparatus of claim 9, wherein the key transformation comprises an expression.

13. The apparatus of claim 12, wherein the expression is a built-in function.

14. The apparatus of claim 12, wherein the expression is a user-defined function.

15. The apparatus of claim 12, wherein expression is a scalar function.

16. The apparatus of claim 12, wherein the expression is a table function.

17. An article of manufacture comprising a computer program carrier readable by a computer and embodying one or more instructions executable by the computer to perform method steps for generating an index stored in a B-tree, which is stored on a data storage device connected to the computer, the method comprising the steps of:

processing one or more key sources using key transformation; and generating a plurality of key targets based on the processed key sources.

18. The article of manufacture of claim 17, wherein at least one of the key sources comprises an attribute.

19. The article of manufacture of claim 17, wherein at least one of the key sources comprises a compound object.

20. The article of manufacture of claim 15, wherein the key transformation comprises an expression.

21. The article of manufacture of claim 20, wherein the expression is a built-in function.

22. The article of manufacture of claim 20, wherein the expression is a user-defined function.

23. The article of manufacture of claim 20, wherein the expression is a scalar function.

24. The article of manufacture of claim 20, wherein the expression is a table function.

* * * * *